(12) United States Patent
Bouta

(10) Patent No.: US 8,122,353 B2
(45) Date of Patent: Feb. 21, 2012

(54) COMPOSING A MESSAGE IN AN ONLINE TEXTBOX USING A NON-LATIN SCRIPT

(75) Inventor: Brian Bouta, Santa Clara, CA (US)

(73) Assignee: Yahoo! Inc., Sunnyvale, CA (US)

(*) Notice: Subject to any disclaimer, the term of this patent is extended or adjusted under 35 U.S.C. 154(b) by 580 days.

(21) Appl. No.: 12/267,299

(22) Filed: Nov. 7, 2008

(65) Prior Publication Data

US 2010/0122203 A1    May 13, 2010

(51) Int. Cl.
    *G06F 3/00*    (2006.01)
(52) U.S. Cl. ........ 715/262; 715/263; 715/264; 715/265; 715/780; 704/8; 704/277; 704/4; 704/9; 704/10
(58) Field of Classification Search ................ 704/1–10, 704/277; 715/262–264, 780
    See application file for complete search history.

(56) References Cited

U.S. PATENT DOCUMENTS

| | | | | |
|---|---|---|---|---|
| 5,416,898 A * | 5/1995 | Opstad et al. | ................ | 345/468 |
| 5,457,454 A * | 10/1995 | Sugano | ........................... | 341/22 |
| 5,696,980 A * | 12/1997 | Brew | ............................ | 704/273 |
| 5,966,719 A * | 10/1999 | Okumura | ...................... | 715/273 |
| 6,032,164 A * | 2/2000 | Tsai | ............................... | 715/263 |
| 6,154,758 A * | 11/2000 | Chiang | ........................... | 715/263 |
| 6,512,467 B1 * | 1/2003 | Hanko et al. | .................... | 341/22 |
| 6,906,644 B2 * | 6/2005 | Satoh | .............................. | 341/51 |
| 7,277,732 B2 * | 10/2007 | Chen et al. | ..................... | 455/566 |
| 7,324,935 B2 * | 1/2008 | Lee | .................................... | 704/8 |
| 7,417,566 B2 * | 8/2008 | Pham | ........................... | 341/22 |
| 7,424,675 B2 * | 9/2008 | Lee et al. | ....................... | 715/262 |
| 7,512,533 B2 * | 3/2009 | Fux et al. | .......................... | 704/7 |
| 7,595,742 B2 * | 9/2009 | Cozzi et al. | ..................... | 341/28 |
| 7,653,529 B2 * | 1/2010 | Litster et al. | ..................... | 704/8 |
| 7,801,722 B2 * | 9/2010 | Kotipalli et al. | .................. | 704/8 |
| 7,925,496 B1 * | 4/2011 | Rubin | ............................. | 704/7 |
| 2002/0133523 A1 * | 9/2002 | Ambler et al. | ................ | 707/536 |
| 2007/0101117 A1 * | 5/2007 | Piwonka et al. | .................. | 713/2 |
| 2007/0174771 A1 * | 7/2007 | Mistry | ......................... | 715/703 |
| 2007/0203692 A1 * | 8/2007 | Fux et al. | ......................... | 704/7 |
| 2007/0239760 A1 * | 10/2007 | Simon | ........................... | 707/102 |
| 2008/0150900 A1 * | 6/2008 | Han | ................................ | 345/171 |
| 2008/0165035 A1 * | 7/2008 | Bhella et al. | .................... | 341/23 |
| 2008/0215508 A1 * | 9/2008 | Hanneman et al. | ............. | 706/11 |
| 2008/0221867 A1 * | 9/2008 | Schreiber | ......................... | 704/8 |

* cited by examiner

*Primary Examiner* — Ryan Pitaro
(74) *Attorney, Agent, or Firm* — Stattler-Suh PC

(57) ABSTRACT

A method and an apparatus are provided for composing a message in an online textbox using a non-Latin script. In one example, the method includes receiving a selection of a target language for composing the message in the online textbox, loading a hash table and an integer n that are associated with the target language, adding to a queue a character inputted from a QWERTY keyboard, and applying appropriate parsing and mapping techniques to the queue using the hash table and the integer n to display an appropriate script of the target language.

19 Claims, 10 Drawing Sheets

```
var map = new Array(128);

map['A']  = "\u0410";
map['B']  = "\u0411";
map['V']  = "\u0412";
map['G']  = "\u0413";
map['D']  = "\u0414";
map['E']  = "\u0415";
map['EH'] = "\u0401"; // capital yo
map['ZH'] = "\u0416";
map['Z']  = "\u0417";
map['I']  = "\u0418";
map['J']  = "\u0419";
map['K']  = "\u041A";
```

COMPOSING A MESSAGE IN AN ONLINE TEXTBOX USING A NON-LATIN SCRIPT

FIELD OF THE INVENTION

The present invention relates to composing a message online. More particularly, the present invention relates to composing a message in an online textbox using a non-Latin script.

BACKGROUND OF THE INVENTION

Companies like Yahoo!® typically allow users to set their preferred content in the company's portal application for the Internet. If the language in which the preferred content is displayed uses a non-Latin script, all content will be displayed in that script. For example, if one changes their preferred content to Yahoo!® Greece, everything including the Yahoo!® Mail user interface will be displayed not only in the Greek language, but also in Greek script. Unfortunately, when one goes to compose a letter in that email program, the script is still Latin. Yahoo!® does not offer composition of email letters in any script other than Latin.

Google® also offers their users to render the Gmail® user interface in one of 37 different languages, many of which are displayed in non-Latin scripts. However, when one attempts to compose a email letter, the only script available is Latin. For Indic languages, Google® does offer an Indic transliterator at http://www.google.com/transliterate/indic. The transliterator is inconsistent in its transliteration and is not integrated into an online application, such as an email application or text message application.

FIG. 3 is an example of a conventional email interface 300. Various email providers give options of languages in which to render their email UI (user interface). The conventional email interface 300 shows an example of Yahoo!® Mail in Russian.

FIG. 4 is another view of the conventional email interface 300 of FIG. 3. Unfortunately, when a user clicks to compose a new letter, the user is restricted to the use of a Latin-based script.

Unfortunately, there is no online email service provider or text messaging service provider that offers the ability to compose email letters in any script other than Latin.

SUMMARY OF THE INVENTION

What is needed is an improved method having features for addressing the problems mentioned above and new features not yet discussed. Broadly speaking, the present invention fills these needs by providing a method and an apparatus for composing a message in an online textbox using a non-Latin script. It should be appreciated that the present invention can be implemented in numerous ways, including as a method, a process, an apparatus, a system or a device. Inventive embodiments of the present invention are summarized below.

In one embodiment, method is provided for composing a message in an online textbox using a non-Latin script. The method comprises receiving a selection of a target language for composing the message in the online textbox, loading a hash table and an integer n that are associated with the target language, adding to a queue a character inputted from a QWERTY keyboard, and applying appropriate parsing and mapping techniques to the queue using the hash table and the integer n to display an appropriate script of the target language.

In another embodiment, an apparatus is provided for composing a message in an online textbox using a non-Latin script. The apparatus is configured for receiving a selection of a target language for composing the message in the online textbox, loading a hash table and an integer n that are associated with the target language, adding to a queue a character inputted from a QWERTY keyboard, and applying appropriate parsing and mapping techniques to the queue using the hash table and the integer n to display an appropriate script of the target language.

In still another embodiment, a computer readable medium carrying one or more instructions is provided for composing a message in an online textbox using a non-Latin script. The one or more instructions, when executed by one or more processors, cause the one or more processors to perform the steps of receiving a selection of a target language for composing the message in the online textbox, loading a hash table and an integer n that are associated with the target language, adding to a queue a character inputted from a QWERTY keyboard, and applying appropriate parsing and mapping techniques to the queue using the hash table and the integer n to display an appropriate script of the target language.

The invention encompasses other embodiments configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

FIG. 9 is an example of a small portion of a JavaScript file for the script converter, in accordance with an embodiment of the present invention;

FIG. 13 is an output of the script converter after a user types "a" on a QWERTY keyboard during a Hindi mapping, in accordance with an embodiment of the present invention;

FIG. 14 is an output of the script converter after a user types "aa" on a QWERTY keyboard during a Hindi mapping, in accordance with an embodiment of the present invention;

FIG. 15 is the expected result from typing "aaa" on a QWERTY keyboard during a Hindi mapping, in accordance with an embodiment of the present invention;

FIG. 16 is the result from typing 'aaaa' on a QWERTY keyboard during a Hindi mapping, in accordance with an embodiment of the present invention;

FIG. 17 is an output of the script converter after a user types "a" on a QWERTY keyboard during a Chinese mapping, in accordance with an embodiment of the present invention; and FIG. 18 is an output after the user selects a character of choice from the Chinese characters of FIG. 17, in accordance with an embodiment of the present invention.

DETAILED DESCRIPTION OF THE INVENTION

Figure 1:
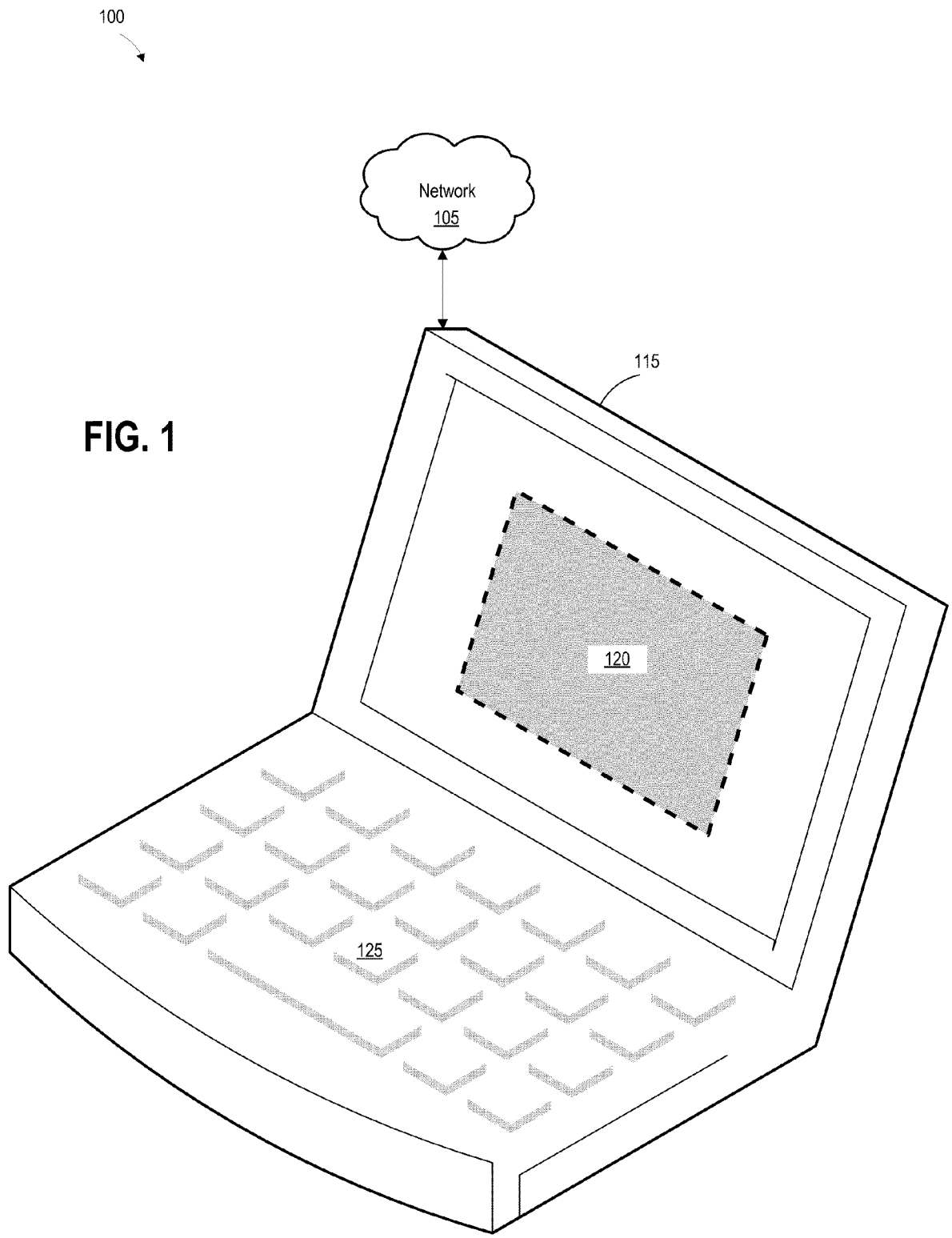
FIG. 1 is a block diagram of a system for composing a message in an online textbox using a non-Latin script, in accordance with an embodiment of the present invention.

An invention is disclosed for a method and an apparatus for composing a message in an online textbox using a non-Latin script. Numerous specific details are set forth in order to provide a thorough understanding of the present invention. It will be understood, however, to one skilled in the art, that the present invention may be practiced with other specific details.
Overview of Architecture FIG. 1 is a block diagram of a system 100 for composing a message in an online textbox using a non-Latin script, in accordance with an embodiment of the present invention. A device of the present invention is hardware, software or a combination thereof. A device may sometimes be referred to as an apparatus or a mechanism. Each device is configured to carry out one or more steps of the method of composing a message in an online textbox using a non-Latin script.

The network 105 couples together a user computer 115 and any other network device (not shown), such as an application server, web server, another user computer, or any other computing device. The network 105 may be any combination of networks, including without limitation the Internet, a local area network, a wide area network, a wireless network and a cellular network. The user computer 115 may be any type of computing device on which a user may communicate with other computing devices coupled to the network 105. For example, the user computer 115 may be a desktop computer, a laptop computer, a workstation, a smart phone, a cell phone, or a mobile computing device, among other devices.

The user computer 115 includes without limitation a script converter 120 and a QWERTY keyboard 125. The user computer 115 is coupled to a recipient device (not shown) via the network 105. The recipient device is configured to receive a message from the user computer 115 via email, text messaging or some other electronic messaging mechanism. The script converter 120 is a device that carries out the more important operations of the system 100.

In an alternative embodiment, the script converter 120 is located simultaneously across a combination of devices, such as across the user computer 115 and an application server (not shown). For example, the script converter 120 may have some functionality that is downloadable as a plug-in to the user computer 115, while maintaining some or most functionality at an application server (not shown) or a web server (not shown).
Script Converter Design The objectives of the script converter include without limitation the following: to give users the option of composing letters in an online textbox using scripts of their choice; to develop a framework to which new scripts can be added conveniently to the online textbox; and to develop a framework that is reusable in other properties of the online textbox.

The script converter provides a script option that is easily integrated in any online textbox. In particular, the script converter provides a script option that is easily integrated in any commercially available messaging service, such as an emailing service, an SMS (Short Message Service), a text messaging service, or any other online messaging service. The description here primarily uses a UI (user interface) of Yahoo!® Mail for exemplary purposes in order to describe the functionality of the script converter.

Figure 5:
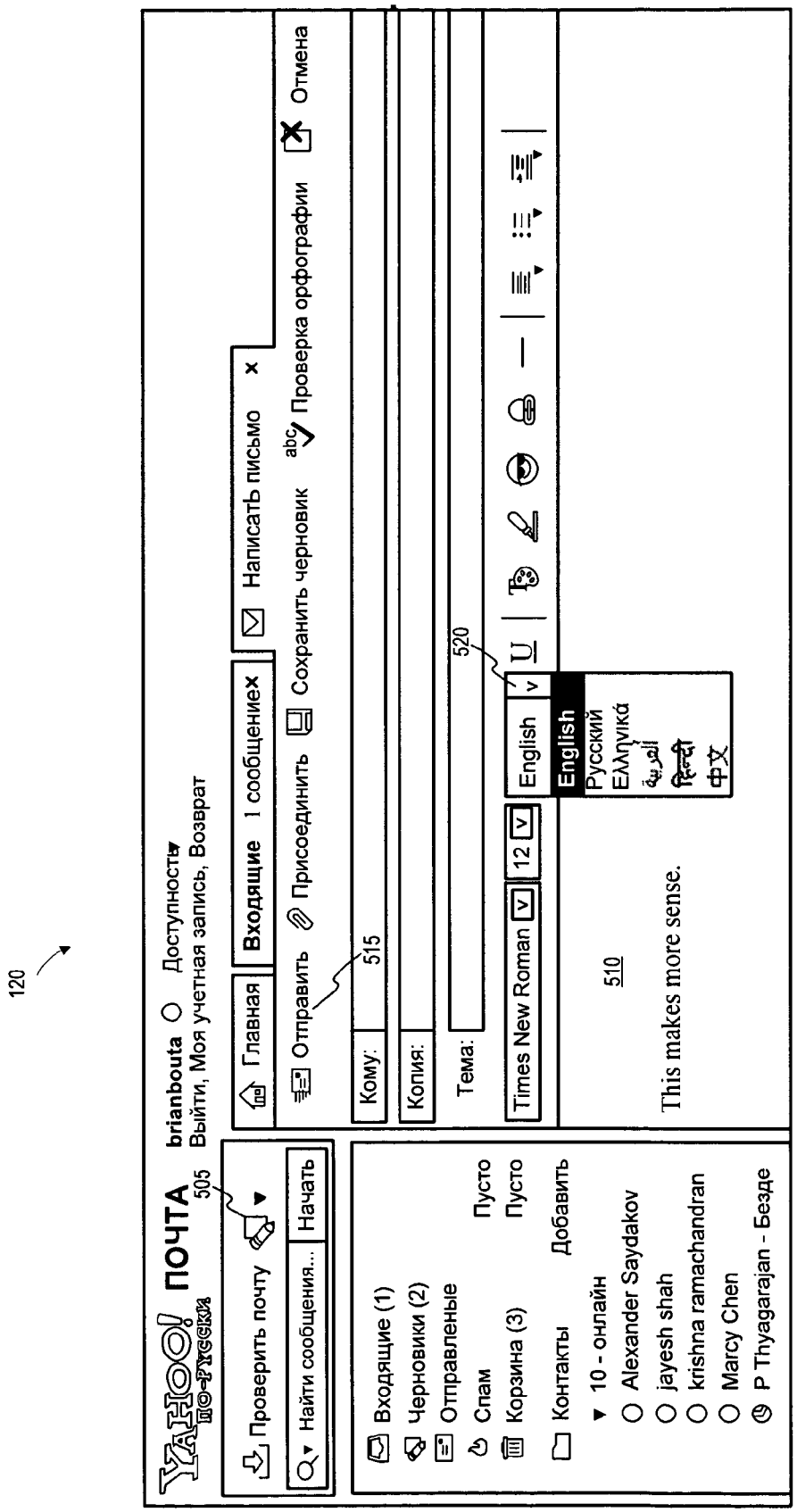
FIG. 5 is an example interface of the script converter, in accordance with an embodiment of the present invention.

FIG. 5 is an example interface of the script converter 120, in accordance with an embodiment of the present invention. The script converter 120 in this example operates within the context of an email application, specifically Yahoo!® Mail. In this context, the script converter 120 allows a user to choose from among various target languages (e.g., English, Russian, Arabic, and Hindi) configured into the script converter 120. The user may push a compose button 505 configured to initiate an interface for composing a letter. The script converter 120 then displays the interface, which includes without limitation a text box 510. The script converter 120 is configured to carry out a mapping between the QWERTY keyboard and the script of the target language. The script converter 120 displays a send button 515 in the script of the target language, which is Russian in this example of FIG. 5. As the user types a message in the text box 510, the text is realized in the script of the target language. The user may then press the send button 515 to send the composed email.

Figure 6:
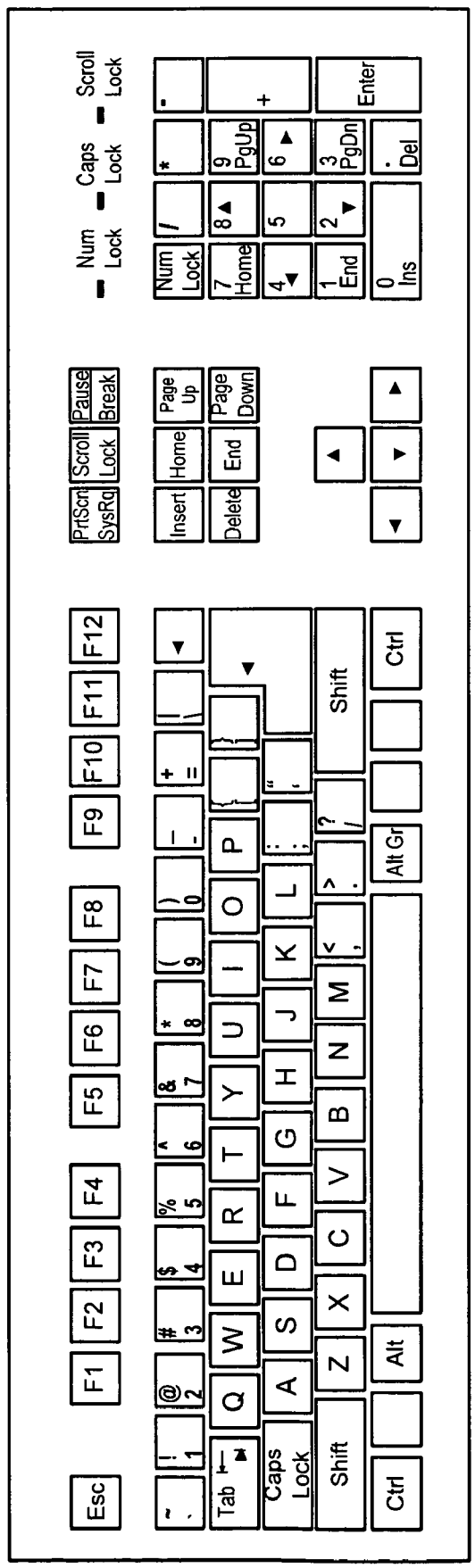
FIG. 6 is an example of a QWERTY keyboard, in accordance with an embodiment of the present invention.

FIG. 6 is an example of a QWERTY keyboard 125, in accordance with an embodiment of the present invention. The scripts of many languages have more characters than the number of characters provided on a normal QWERTY keyboard 125. For example, Hindi has hundreds of characters; Chinese has thousands. The form of a character may depend on those characters preceding it and following it. For example, the form of a letter in Arabic can depend on several letters that may precede it and follow it. Therefore, characters may have to change form as a user types.

In one embodiment, the mapping from the QWERTY keyboard to the script of the target language is based on phonetics. However, the script converter is not so limited to phonetics. A developer may base the mapping from the QWERTY keyboard on a different concept than phonetics.

The script converter takes user textual input and tries to match up to n keys in a mapping stored separately from the parser, where n is a non-negative integer. The script converter provides a mapping from the QWERTY keyboard 125 to the script of any language. A user, once comfortable with a given mapping, can become quite proficient at using the QWERTY keyboard 125 to type a non-Latin script. As one example, the script converter allows a user of Yahoo!® Mail to compose email letters in non-Latin scripts.

Referring to FIG. 5, the code of the script converter 120 may be modularized into two JavaScript files: one for the parsing and one for the mapping. Accordingly, the script converter 120 includes a parser device and a mapping device. The script converter 120 receives a selection of a target language via a selector device 520, which is a drop-down menu in this example. The script converter 120 then loads an integer n into the parser device and loads a hash table (i.e., mapping) into the mapping device. The integer n and the hash table are associated with the selected target language. In one embodiment, the script converter 120 loads the integer n and the hash table from a memory of the user computer. In an alternative embodiment, the script converter 120 downloads the integer n and the hash table from an external computing device, such as an application server or a web server.

The parser collects the user's textual input into a queue and attempts to match n characters from the queue with an entry in the mapping's hash table. If no match is made, then the parser attempts to match n−1 characters between the front of the queue and the mapping. If no match is made, then the parser attempts to match n−2 characters, and so on until it reaches the front of the queue. If no match is made at all, then the parser merely waits until the user's next input is added to the queue. Generally, n is typically rather small, for example, no more than 5. The script converter 120 executes this process for each character the user inputs.

Some scripts have far more letters or far more representations for their letters or combinations of letters than does the English language. Accordingly, any mapping between the basic QWERTY keyboard (i.e., the letters, numbers, and shift key, and such a script) cannot be bijective, or one-to-one. Requirements for the script converter 120 may include, for example, the following: use only common keys (e.g., only use the letters, numbers, and shift key, and do not force the user to have to become accustomed esoteric keys, such as the control key or alternate key); allow the developer of the script converter to use essentially any number of letters in a given combination to represent a character in the non-Latin script; and facilitate ease of development (e.g., use one parser for all target languages and a separate mapping for each language).

The parser and mappings of the script converter may be written in JavaScript. The Web pages may be written in standard HTML (hypertext markup language).

When the user chooses a target language, an integer n is passed to the parser. This parameter represents the maximum number of Latin characters on the QWERTY keyboard that the parser will try to map from Latin to the script of the target language. The mapping is preferably a phonetic mapping from Latin characters on the QWERTY keyboard.

The mapping is merely a hash table. The keys are QWERTY keyboard characters or combinations of characters up to n characters. The values are the Unicode letters of the script of the target language.

As the user types characters using the QWERTY keyboard, the characters are stored in a queue. The maximum size of the queue is n. As an example, the script converter may use an integer of 2 for Russian and Arabic, and may use an integer of 4 for Hindi.

The parser tries to match the n characters in the queue with an entry in the hash table. If the parser cannot match all n characters, then the parser will try to match the first n−1 characters in the queue. If no match is found, then the parser will try to match n−2 characters, and so on.

Referring to FIG. 1, it is important to note that the script converter 120 must operate in a system 100 having certain features in order for the script converter 120 to work properly. For example, the recipient must have the necessary fonts installed. Also, it may be necessary to supply instructions for users whose mail is not readable. In one embodiment, the recipient's mail provider must deliver the mail in the Unicode format in which the mail was composed. The system 100 may provide a header or footer in the local language in Latin script, stating that if the mail is unreadable, then the user can open a new account of the email service provider (e.g., Yahoo!®) and have the addresser resend the mail to the new account.

Figure 7:
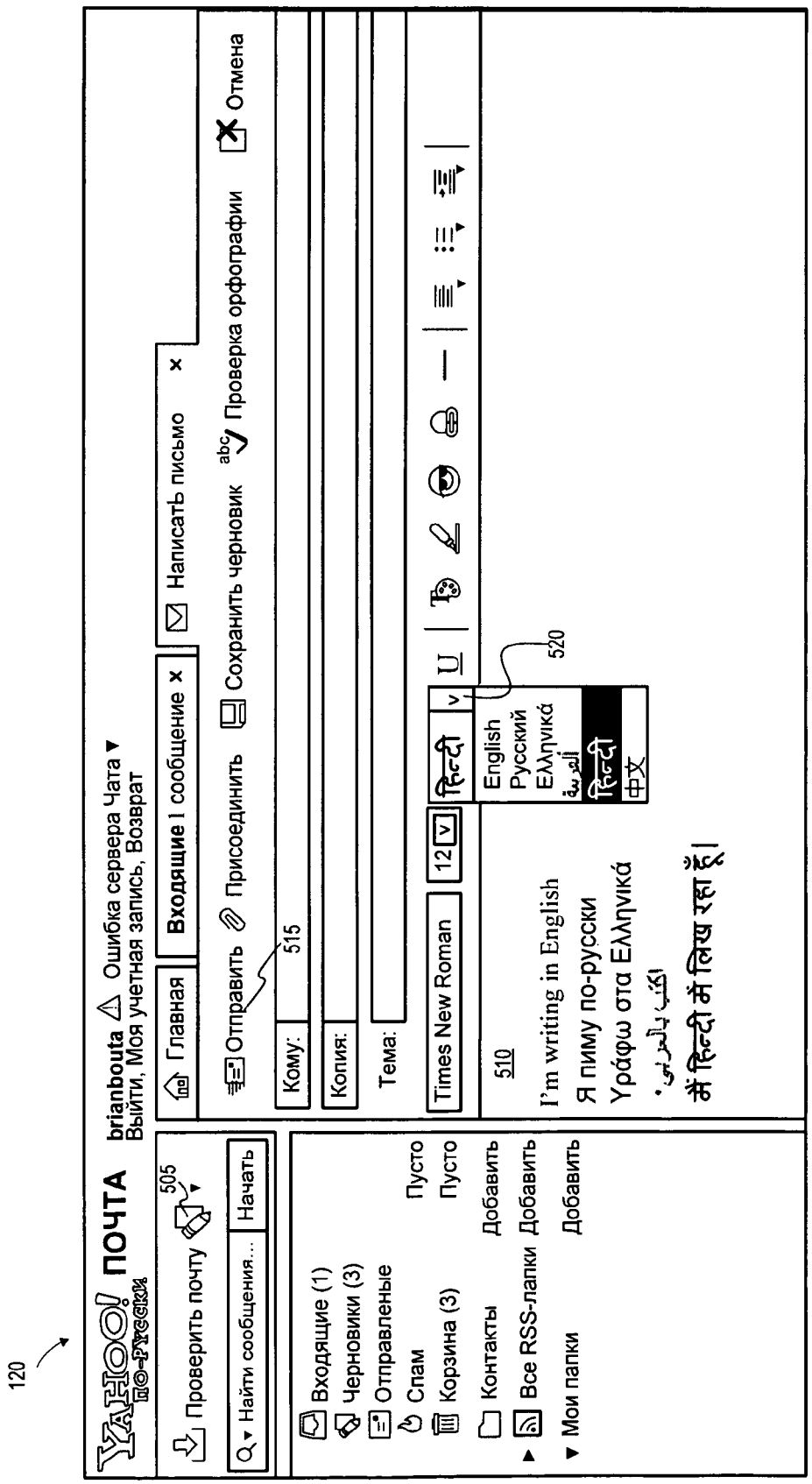
FIG. 7 is an example interface with results in a text box after keys are typed on a QWERTY keyboard, in accordance with an embodiment of the present invention.

FIG. 7 is an example interface with results in a text box 510 after keys are typed on a QWERTY keyboard, in accordance with an embodiment of the present invention. The text box 510 has scripts of several different languages. Such variety is possible in one text box 510 because the selector device 520 provides a toggling feature between the various target languages of choice. In other words, a user may use selector device 520 to write in a script of a selected target language, and then the user may use the selector device 520 to write in a script of another selected target language, and so on. These different scripts may show at the same time in the same textbox 510 as shown in FIG. 7.

The parser of the script converter 120 is based on pushing the user's input into a queue and matching as many characters as possible, up to n characters. The parameter n is loaded when the user chooses the target language. The mapping for a given target language is kept in an associated hash table (i.e., associated array). The hash table is passed to the parser after the user has selected the target language. The script converter 120 uses Unicode standard characters.

Figure 8:
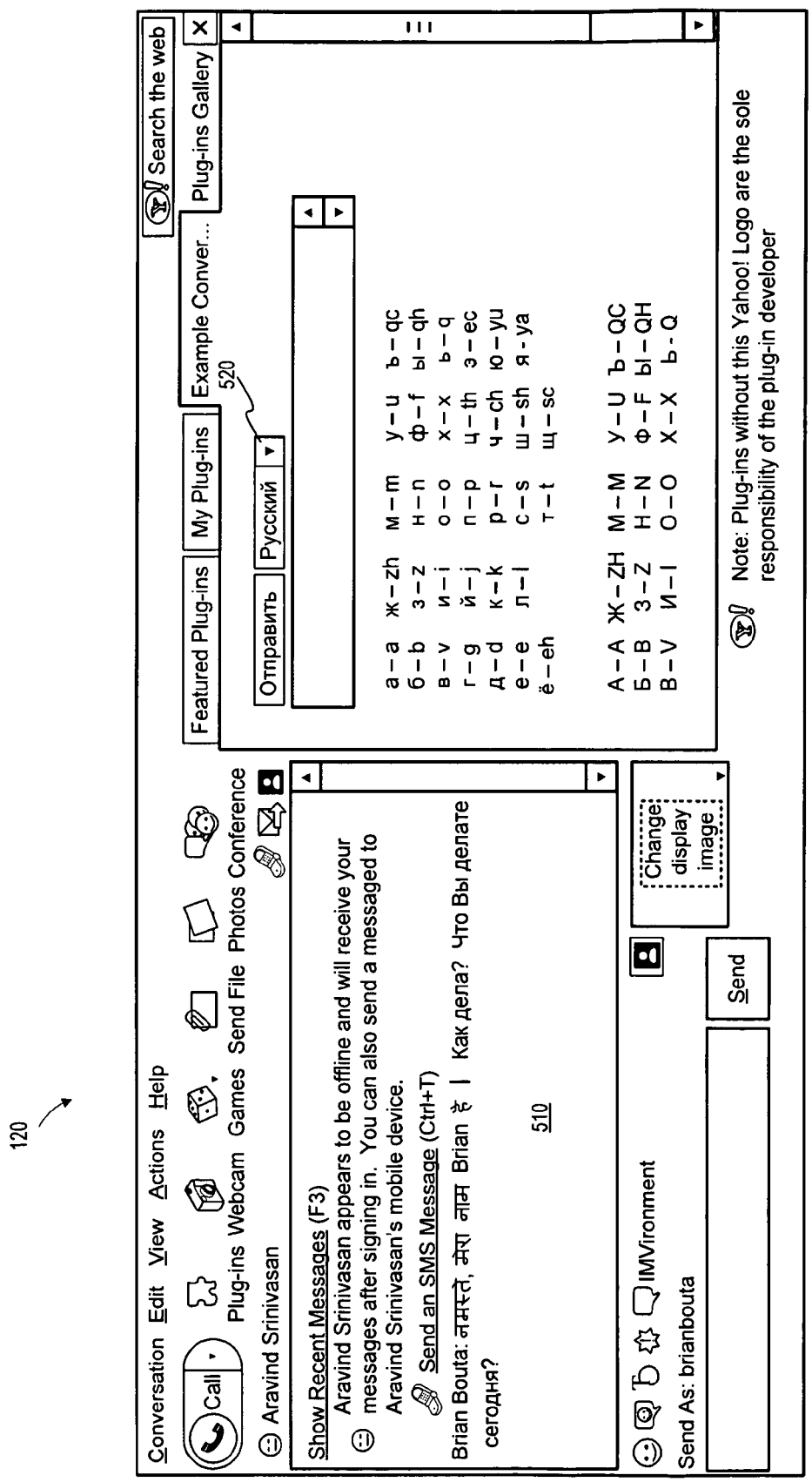
FIG. 8 is another example interface of the script converter, in accordance with an embodiment of the present invention.

FIG. 8 is another example interface of the script converter 120, in accordance with an embodiment of the present invention. This interface illustrates a messenger plug-in. To illustrate the plug-in feature of the script converter, a Yahoo!® Messenger plug-in is shown here that uses the n-key parser. Target language options (not shown) are, for example, English, Russian, Greek, Arabic, Hindi, and Chinese. It is appealing to be able to send and receive text messages written in the various scripts.

The same script converter 120, including the parser device and the mapping device, provides text converting functionality for a number of scripts. Examples include without limitation alphabets with which a straight mapping with Latin is feasible (e.g., Russian, Greek), alphabets for languages that are read right to left (e.g., Arabic), alphabets in which the form of a letter depends on letters that precede or follow it (i.e., letters that change form as the user types, such as Arabic or Hindi), character-based languages (e.g., Chinese).

FIG. 9 is an example of a small portion of a JavaScript file for the script converter, in accordance with an embodiment of the present invention. This example is provided to demonstrate functionality of the script converter, including the parser device and the mapping device. This particular JavaScript file is for a mapping from the QWERTY keyboard into Russian script.

Suppose a user has chosen Russian using the selection device (e.g., dropdown list). The parameter n=2 is passed to the parser and the mapping module "russian.js", a JavaScript file, is loaded. A small portion of russian.js is shown in FIG. 9. The user types the letter "s". The parser enters the character "s" into its queue, such that Queue="s". The parser then tries to match the character string "s" with an element in the map array. The parser finds the map map["s"]="\u0441" (not shown); and so returns the Russian letter "c".

Figure 10:
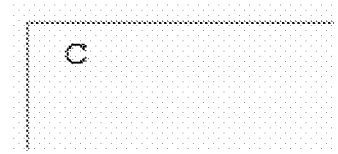
FIG. 10 is an output of the script converter after a user types "s" on a QWERTY keyboard during a Russian mapping, in accordance with an embodiment of the present invention.

FIG. 10 is an output of the script converter after a user types "s" on a QWERTY keyboard during a Russian mapping, in accordance with an embodiment of the present invention. As discussed above with reference to FIG. 9, a JavaScript for Russian is loaded in the script converter. The user types the letter "s" on the QWERTY keyboard. The script converter returns the Russian letter "c" as shown.

Figure 11:
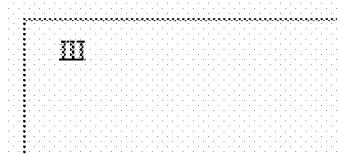
FIG. 11 is an output of the script converter after a user types "s" and then "h" on a QWERTY keyboard during a Russian mapping, in accordance with an embodiment of the present invention.

FIG. 11 is an output of the script converter after a user types "s" and then "h" on a QWERTY keyboard during a Russian mapping, in accordance with an embodiment of the present invention. As discussed above with reference to FIG. 9, a JavaScript for Russian is loaded in the script converter. Continuing from FIG. 10, the user now types the letter "h" on the QWERTY keyboard. The parser enters "h" into the queue, such that Queue="sh". The parser tries first to match the entire string in the queue. Finding the match map["sh"]="\u0448" (not shown), the parser returns the Russian letter 'ш' and replaces the 'c' with the 'ш', as shown in FIG. 11.

Figure 12:
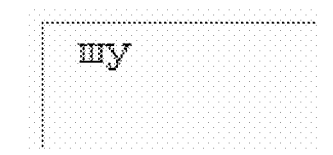
FIG. 12 is an output of the script converter after a user types "s", "h", and then "u" on a QWERTY keyboard during a Russian mapping, in accordance with an embodiment of the present invention.

FIG. 12 is an output of the script converter after a user types "s", "h", and then "u" on a QWERTY keyboard during a Russian mapping, in accordance with an embodiment of the present invention. As discussed above with reference to FIG. 9, a JavaScript for Russian is loaded in the script converter. Continuing from FIG. 11, the user now types the letter "u" on the QWERTY keyboard. Note that in this explanation, the script converter has set n=2 for Russian. Accordingly, the queue only has space for two characters. The script converter pops the "s" from the queue in a first-in/first-out manner. The script converter pushes the "u" to the front of the queue, such that Queue="hu". The parser tries to match the string "hu" in the mapping in russian.js but cannot make a match. So, the parser then decrements the length of the string it will try to match by 1 (i.e., to n−1, or 2−1=1) toward the front of the queue, where currently the "u" is positioned. The string it will try to match now is "u". The parser finds the mapping "\u0443" (not shown); and returns the Russian letter "y" to the output component to give the result in FIG. 12.

Note that, when one considers this particular example, it is important that the mapping for the character "h" does not exist. That is, ambiguity would arise if both mappings (i.e., map['sh'] and map['s']map['h']) existed in one language JavaScript module. A developer must practice considerable care when creating a mapping, and must consider all of the different combinations of letters for both the input and output.

FIG. 13 is an output of the script converter after a user types "a" on a QWERTY keyboard during a Hindi mapping, in accordance with an embodiment of the present invention. This Hindi mapping example of FIGS. 13-16 illustrates the flushing mechanism of the script converter. A common and useful mapping is to use a single letter, for example "a", for a short vowel sound and two letters, for example "aa", for a long vowel sound. Of course, it's possible to choose "a" and then "A" for the two sounds, respectively. However, perhaps it is a little more intuitive and convenient to represent the two sounds with "a" and "aa". Such desired representations are numerous in Arabic and Hindi.

For Hindi, if the code for the two mappings is given as map["a"]="\u0905", and map["aa"]="\u0906", and if n is at least 2 for Hindi, then there is a problem. Typing the first "a" gives the result in FIG. 13.

FIG. 14 is an output of the script converter after a user types "aa" on a QWERTY keyboard during a Hindi mapping, in accordance with an embodiment of the present invention. Typing the second "aa" gives the result in FIG. 14.

FIG. 15 is the expected result from typing "aaa" on a QWERTY keyboard during a Hindi mapping, in accordance with an embodiment of the present invention. Typing the third "a" in "aaa", however, repeats the result in FIG. 14 instead of providing the expected result in FIG. 15.

FIG. 16 is the result from typing 'aaaa' on a QWERTY keyboard during a Hindi mapping, in accordance with an embodiment of the present invention. When the third "a" is typed, the last two characters in the parser's queue are "aa". A match on "aa" is found. So, the previous आ, as in FIG. 14, is replaced with the new आ. To the user, of course, nothing appears to have happened; that is, continually pressing "a" seems to have no effect after the first आ is printed.

To overcome this problem, a flushing mechanism is added to the parser. The mapping above is replaced with the mappings map["a"]="\u0905" and map["aa"]="\u0906&". Note the ampersand after the 6 in the map for "aa". If the parser sees this symbol at the end of a match it has made while trying to map a user's input, the parser will flush the queue. The result is typing "aaa" gives the expected result in FIG. 15, and typing a fourth "a" gives the result in FIG. 16. Moreover, continually typing "a" will repeat the आ, as one would expect.

FIG. 17 is an output of the script converter after a user types "a" on a QWERTY keyboard during a Chinese mapping, in accordance with an embodiment of the present invention. This Chinese mapping example in FIGS. 17-18 illustrates the slider mechanism of the script converter. In an effort to include character-based languages like Chinese, a slider mechanism is provided as additional functionality of the parser. If the user chooses a language like Chinese, a parameter (true-false flag) is passed that indicates the slider is needed. Specifically for Chinese, the mapping matches pinyin (i.e., the Romanization of Chinese characters) to the Unicode representation of the Chinese characters. (Here, the four tones in Mandarin Chinese will be ignored.) Because a pinyin word can stand for several Chinese characters, a single pinyin entry is mapped to a space-delimited list of Chinese characters (i.e., multiple characters), for example, map['yi']="\u554A\u2081 \u963F\u2082 \u55C4\u2085 \u814C\u2086".

While the script converter may use pinyin to map to a Chinese script, the script converter may use a similar multiple character mapping technique for another language. Note that pinyin is not necessarily based on phonetics. Accordingly, for a language other than Chinese, the script converter may use a mapping technique that is analogous to the pinyin technique and not necessarily based on phonetics.

In the example in FIG. 17, the user has typed "a". As shown, "a" maps to seven different Chinese characters. The parser returns the seven characters to the output component. The list of characters is enumerated. The enumeration is shown via subscripts on the characters.

To choose one of the seven characters in FIG. 17, the user has two ways. One way is for the user to scroll right or left through the list until the character of choice is found at the cursor position. The user then types a space to select the character of choice. The script converter keeps the character of choice and removes the remaining characters.

FIG. 18 is an output after the user selects a character of choice from the Chinese characters of FIG. 17, in accordance with an embodiment of the present invention. The cursor appears after the character, as shown in FIG. 18. The vertical line to the right of the character is the cursor. The cursor appears after the character. The cursor is now located after the character. Accordingly, the user can now proceed to type the pinyin representation for the next desired Chinese character.

Another way for choosing among the seven characters in FIG. 17 is for the user to select the number that corresponds to the subscript on the character of choice. The user then types a space to select the character of choice, or the script converter automatically selects the character of choice up the user selecting the corresponding number. As with the first choice, the script converter keeps the character of choice and removes the remaining characters.

Overview of Method

Figure 2:
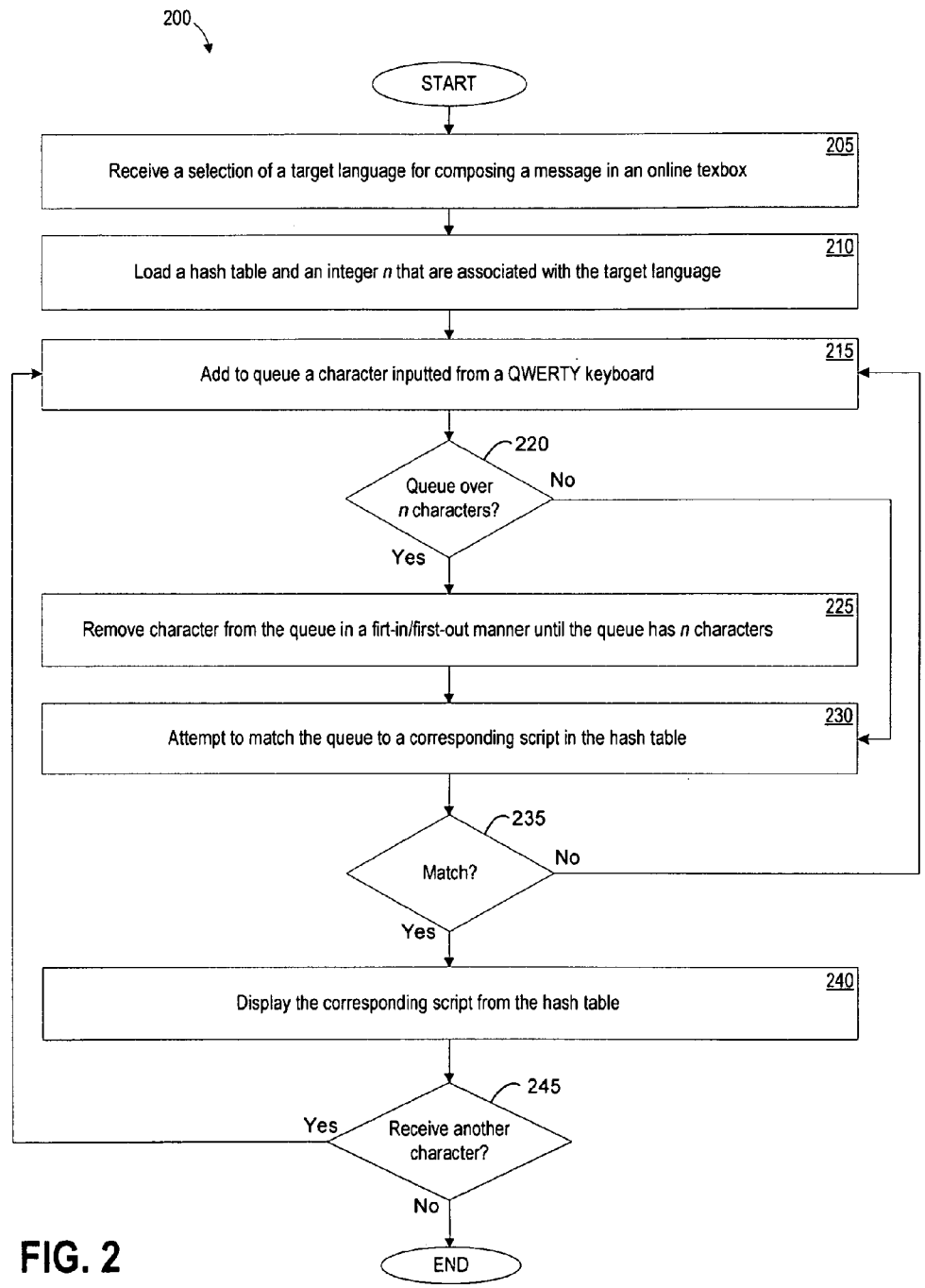
FIG. 2 is a flowchart for a method for composing a message in an online textbox using a non-Latin script, in accordance with an embodiment of the present invention.
Figure 3:
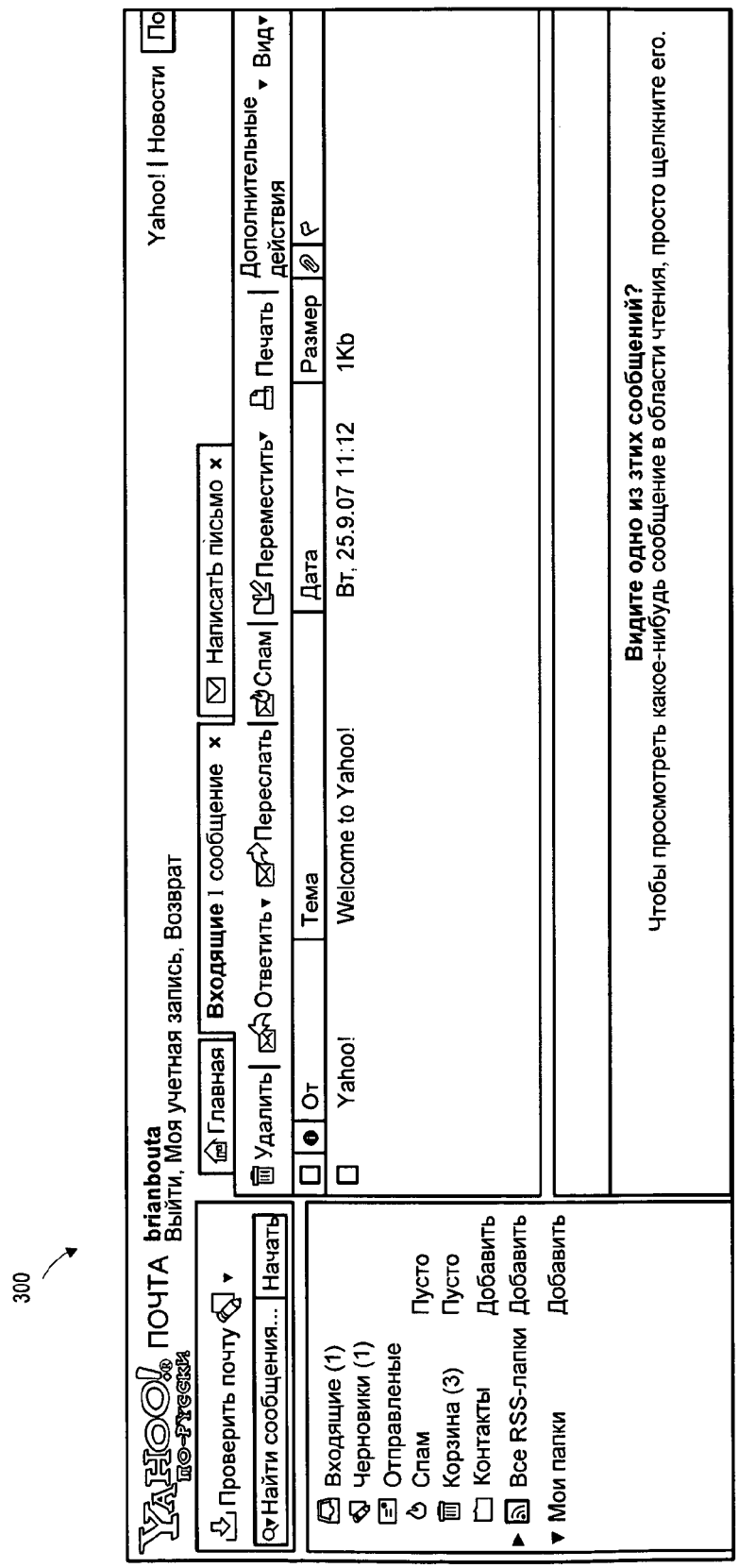
FIG. 3 is an example of a conventional email interface. Various email providers give options of languages in which to render their email UI (user interface)
Figure 4:
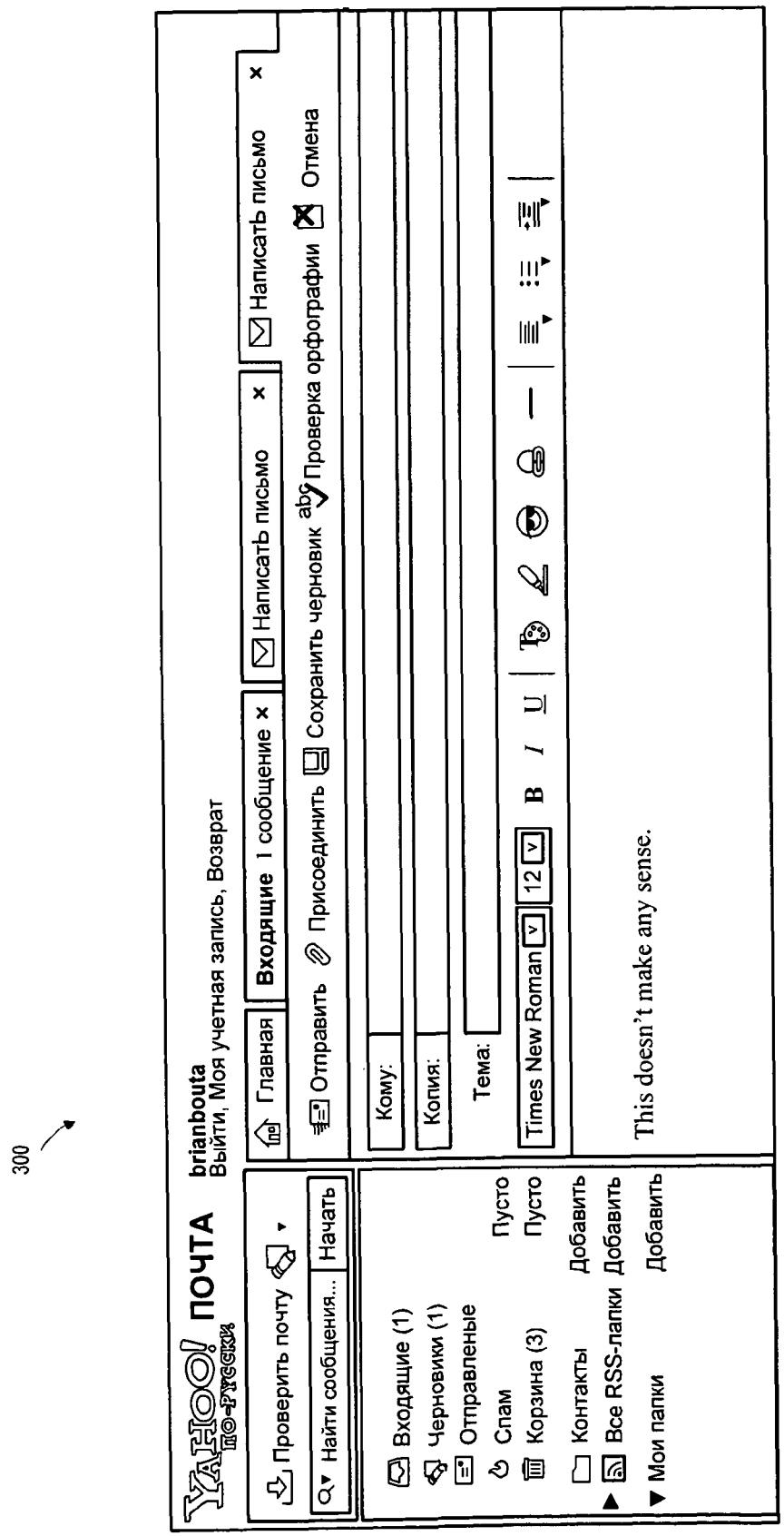
FIG. 4 is another view of the conventional email interface of FIG. 3.

FIG. 2 is a flowchart for a method 200 for composing a message in an online textbox using a non-Latin script, in accordance with an embodiment of the present invention. The steps of the method 200 may be carried out by the script converter 120 of FIG. 1. The method 200 starts in step 205 where the system receives a selection of a target language for composing the message in the online textbox. For example, a user uses the selection device 520 of FIG. 5 to select a target language. The method 200 then moves to step 210 where the system loads a hash table and an integer n that are associated with the target language. Next, in step 215, the system adds to a queue a character inputted from a QWERTY keyboard. For example, the script converter receives input of a character that a user typed on the QWERTY keyboard.

The following steps involve applying appropriate parsing and mapping techniques to the queue to display an appropriate script of the target language. Accordingly, the method 200 moves to decision operation 220 where the system determines if the queue has more than n characters. If the queue does not have more than n characters, then the method 200 advances to step 230 discussed below. Before getting to step 230, if the queue does have more than n characters, then the method 200 moves to step 225 where the system removes a character from the queue in a first-in/first-out manner until the queue has n characters. Next, in step 230, the system attempts to match the queue to a corresponding script in the hash table.

The method 200 then moves to decision operation 235 where the system determines if the queue matches a corresponding script in the hash table. If there is no match in the hash table, then the method 200 returns to step 215 and continues. However, if there is a match in the hash table, then the method moves to step 240 where the system displays the corresponding script from the hash table. For example, the script converter displays a particular Russian script in a textbox of an email application.

The method then proceeds to decision operation 245 where the system determines if another character is being received from the QWERTY keyboard. If the system is receiving another character input from the QWERTY keyboard, then the method 200 returns to step 215 and continues. However, if the system is not receiving another character input from the QWERTY keyboard, then the method 200 is at an end.

Note that the method 200 may include other details that are not discussed in this overview of FIG. 2. For example, the method 200 may include without limitation a toggling feature, a flushing feature, a slider feature, and other features. These other details are discussed above with reference to the appropriate figures.

Computer Readable Medium Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application-specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include without limitation any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include without limitation device drivers, operating systems, and user applications. Ultimately, such computer readable media further includes software for performing the present invention, as described above.

Included in the programming (software) of the general/specialized computer or microprocessor are software modules for implementing the teachings of the present invention, including without limitation receiving a selection of a target language for composing the message in the online textbox, loading a hash table and an integer n that are associated with the target language, adding to a queue a character inputted from a QWERTY keyboard, and applying appropriate parsing and mapping techniques to the queue using the hash table and the integer n to display an appropriate script of the target language, according to processes of the present invention.

Advantages

The script converter functionality in an online messaging service is highly valuable to any users whose native language uses a non-Latin script. This functionality is not available with any conventional online messaging service provider. Accordingly, users of non-Latin scripted languages would naturally be drawn to an online messaging interface having the script converter described here. It helps that the script converter is easy and convenient to use.

The script converter provides enormous flexibility for creating different script mappings, particularly for languages whose number of characters exceeds what is offered with a one-to-one mapping to the QWERTY keyboard. Hindi is an excellent example, which could easily require a mapping in which n=4. Note that this integer n for the mapping in the script converter is discussed extensively above.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for composing a message in an online textbox using a non-Latin script, the method comprising:
    receiving a selection of a target language for composing the message in the online textbox;
    loading a hash table and an integer n that are associated with the target language, the hash table comprises a plurality of entries mapping at least one character of a first language to at least one character of the target language, the integer n comprises a maximum number of characters to add to a queue;
    receiving an input comprising a character of the first language;
    adding to the queue the received character of the first language by determining a number of characters in the queue, if the number of characters in the queue is more than n, then removing at least one character from the queue in a first-in and first-out manner and adding the received character to the end of the queue; and
    parsing the queue by using the hash table to map the queue to an entry in the hash table.

2. The method of claim 1, wherein the parsing further comprises:
    determining that the queue does not have more than n characters; and
    attempting to match the queue to a corresponding script in the hash table.

3. The method of claim 1, wherein the parsing further comprises matching the queue to a corresponding script in the hash table.

4. The method of claim 1, wherein the parsing further comprises:
   failing to match the queue to a corresponding script in the hash table;
   adding to the queue another character inputted; and
   continuing to apply the parsing.

5. The method of claim 1, wherein the receiving the selection of the target language comprises toggling from one target language to another target language.

6. The method of claim 1, wherein the parsing further comprises:
   adding a flushing functionality to the parsing;
   attempting to match the queue to a corresponding script in the hash table; and
   flushing the queue.

7. The method of claim 1, wherein the parsing further comprises:
   adding a slider functionality to the parsing;
   attempting to match the queue to a corresponding script in the hash table; and
   displaying a list of multiple corresponding scripts from the hash table.

8. The method of claim 7, wherein the parsing further comprises:
   receiving a selection of a script from the list of multiple corresponding scripts; and
   displaying the appropriate script based on the selection of the script from the list of multiple corresponding scripts.

9. The method of claim 1, wherein the loading the hash table and the integer n comprises downloading from an external computing device to a user computer at least one of:
   the hash table; and
   the integer n.

10. An apparatus, comprising at least one processor and memory, for composing a message in an online textbox using a non-Latin script, the apparatus being configured for:
    receiving a selection of a target language for composing the message in the online textbox;
    loading a hash table and an integer n that are associated with the target language, the hash table comprises a plurality of entries mapping at least one character of a first language to at least one character of the target language, the integer n comprises a maximum number of characters to add to a queue;
    receiving an input comprising a character of the first language;
    adding to the queue the received character of the first language by determining a number of characters in the queue, if the number of characters in the queue is more than n, then removing at least one character from the queue in a first-in and first-out manner and adding the received character to the end of the queue; and
    parsing the queue by using the hash table to map the queue to an entry in the hash table.

11. The apparatus of claim 10, wherein the apparatus is further configured for:
    determining that the queue does not have more than n characters; and
    attempting to match the queue to a corresponding script in the hash table.

12. The apparatus of claim 10, wherein the wherein the apparatus is further configured for matching the queue to a corresponding script in the hash table.

13. The apparatus of claim 10, wherein the apparatus is further configured for:
    failing to match the queue to a corresponding script in the hash table;
    adding to the queue another character inputted; and
    continuing to apply the parsing.

14. The apparatus of claim 10, wherein the apparatus is further configured for toggling from one target language to another target language.

15. The apparatus of claim 10, wherein the apparatus is further configured for:
    adding a flushing functionality to the parsing;
    attempting to match the queue to a corresponding script in the hash table; and
    flushing the queue.

16. The apparatus of claim 10, wherein the apparatus is further configured for:
    adding a slider functionality to the parsing;
    attempting to match the queue to a corresponding script in the hash table; and
    displaying a list of multiple corresponding scripts from the hash table.

17. The apparatus of claim 16, wherein the apparatus is further configured for:
    receiving a selection of a script from the list of multiple corresponding scripts; and
    displaying the appropriate script based on the selection of the script from the list of multiple corresponding scripts.

18. The apparatus of claim 10, wherein the apparatus is further configured for downloading from an external computing device to a user computer at least one of:
    the hash table; and
    the integer n.

19. A non-transitory computer readable medium carrying one or more instructions for composing a message in an online textbox using a non-Latin script, wherein the one or more instructions, when executed by one or more processors, cause the one or more processors to perform the steps of:
    receiving a selection of a target language for composing the message in the online textbox;
    loading a hash table and an integer n that are associated with the target language, the hash table comprises a plurality of entries mapping at least one character of a first language to at least one character of the target language, the integer n comprises a maximum number of characters to add to a queue;
    receiving an input comprising a character of the first language;
    adding to the queue the received character of the first language by determining a number of characters in the queue, if the number of characters in the queue is more than n, then removing at least one character from the queue in a first-in and first-out manner and adding the received character to the end of the queue; and
    parsing the queue by using the hash table to map the queue to an entry in the hash table.

* * * * *